Dec. 23, 1969  J. O. STEWART  3,485,514

TRAILER HITCH MOUNTING

Filed Jan. 15, 1969  2 Sheets-Sheet 1

INVENTOR
John O. Stewart

BY  *Munson H. Lane*
ATTORNEY

Dec. 23, 1969  J. O. STEWART  3,485,514
TRAILER HITCH MOUNTING
Filed Jan. 15, 1969  2 Sheets-Sheet 2
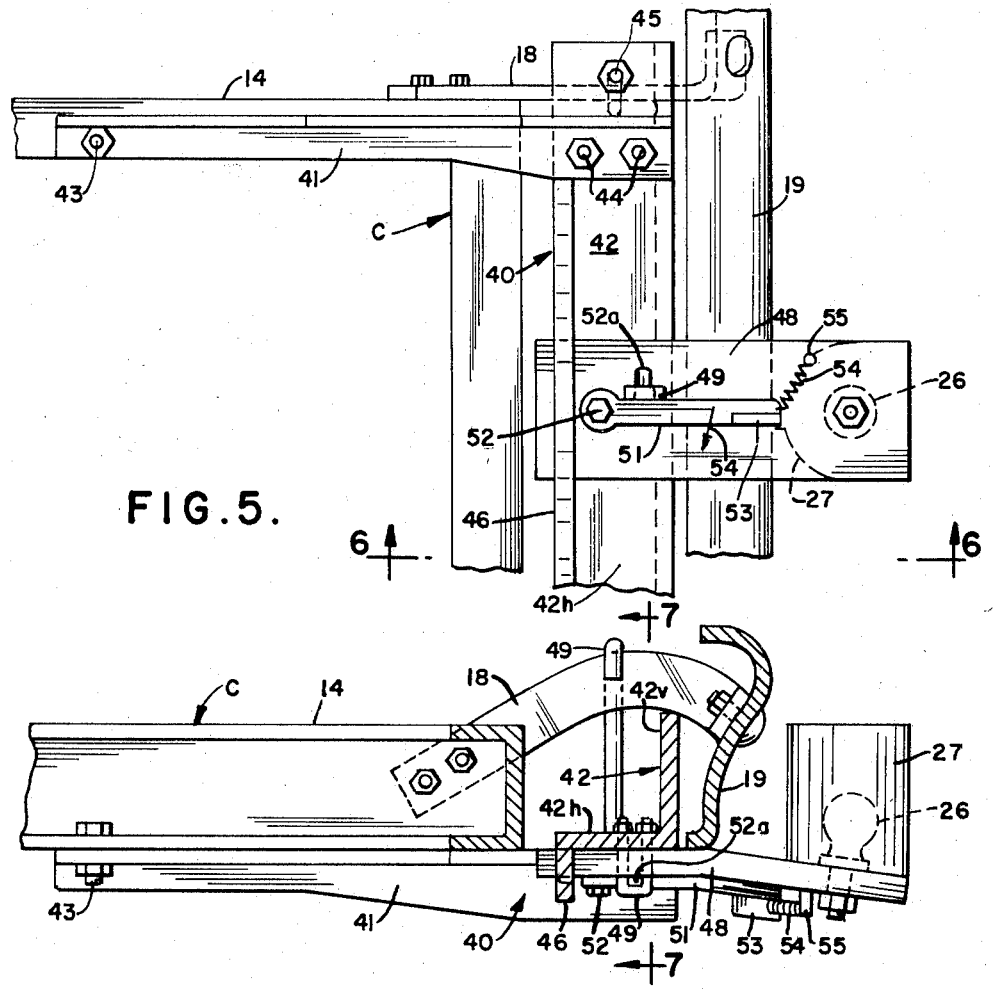
FIG. 5.
FIG. 6.
FIG. 7.
INVENTOR
John O. Stewart
BY 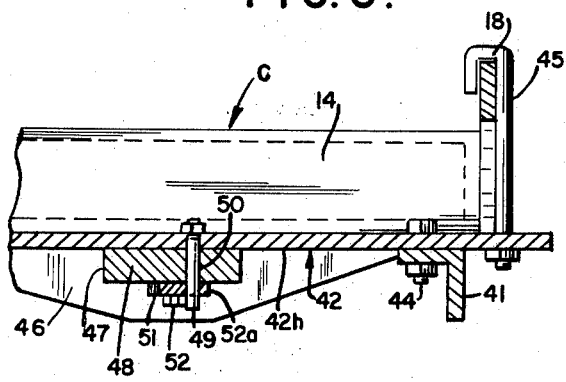
ATTORNEY 3,485,514
TRAILER HITCH MOUNTING
John O. Stewart, 419 E. 2nd St.,
Russellville, Ark. 72801
Continuation-in-part of application Ser. No. 663,318,
Aug. 25, 1967, now Patent No. 3,445,125. This
application Jan. 15, 1969, Ser. No. 791,424
Int. Cl. B60d 1/00, 1/14
U.S. Cl. 280—501                               20 Claims

ABSTRACT OF THE DISCLOSURE

A supporting frame attached to an automobile chassis and including a cross member provided with a socket to receive a removable draw bar. Releasable means are provided for removably locking the draw bar in the socket.

RELATED APPLICATION

This application is a continuation-in-part of my copending application Ser. No. 663,318, filed Aug. 25, 1967, now Patent No. 3,445,125, dated May 20, 1969.

This invention relates to new and useful improvements in trailer hitches used, for example, to draw a trailer by an automobile, and in particular the invention concerns itself with mounting of the hitch draw bar on the automobile chassis.

The principal object of the invention is to provide mounting which includes a supporting frame permanently attached to the automobile chassis and a draw bar which is removably secured to the frame so that it is rigidly held in an operative position, but may be easily and quickly removed when not required.

My aforementioned copending application discloses a trailer hitch having means for automatically coupling the trailer draft tongue to the automobile draw bar. It also discloses draw bar mounting including a supporting frame attached to the automobile chassis, and means for removably locking the draw bar to the frame.

The present application substantially repeats the draw bar mounting of the aforesaid copending application, and additionally includes a modified embodiment of the mounting.

Both embodiments of the invention are simple in construction, economical to manufacture, and lend themselves to installation on chasses of different types.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 4 is a fragmentary sectional detail, taken substantially in the plane of the line 4—4 in FIG. 1;

FIG. 5 is a fragmentary underside plan view showing a modified embodiment of the invention;

FIG. 6 is a fragmentary vertical sectional view, taken substantially in the plane of the line 6—6 in FIG. 5; and FIG. 7 is a fragmentary sectional view, taken substantially in the plane of the line 7—7 in FIG. 6.

Referring now to the accompanying drawings in detail, more particularly to FIGS. 1-4 inclusive, the same illustrate trailer hitch mounting of the type disclosed in my aforementioned copending application.

Figure 1:
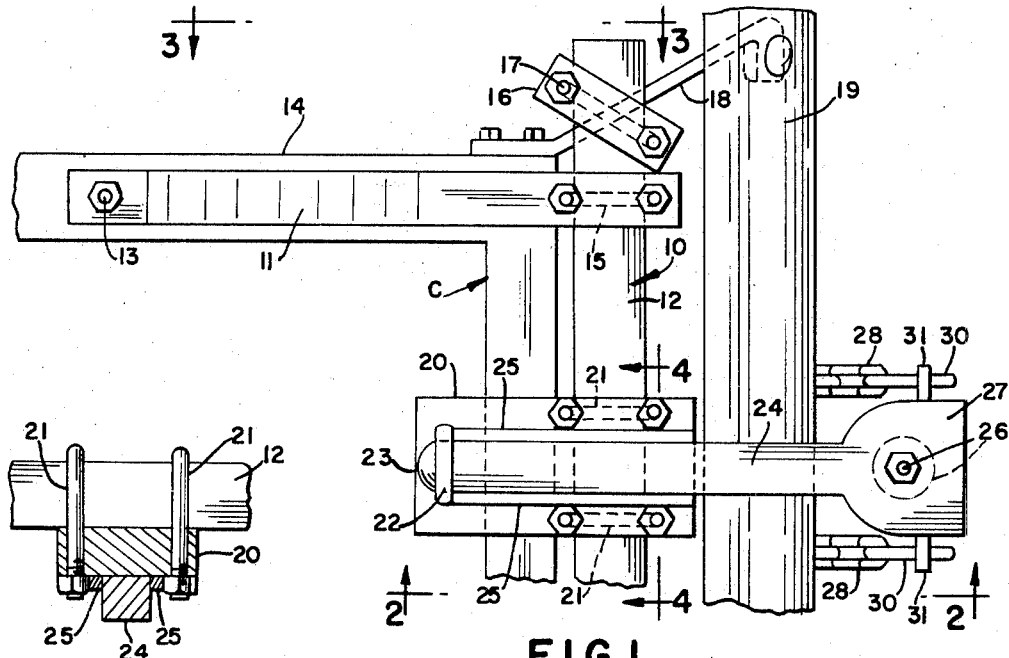
FIG. 1 is a fragmentary underside plan view showing one embodiment of the trailer hitch mounting.
Figure 2:
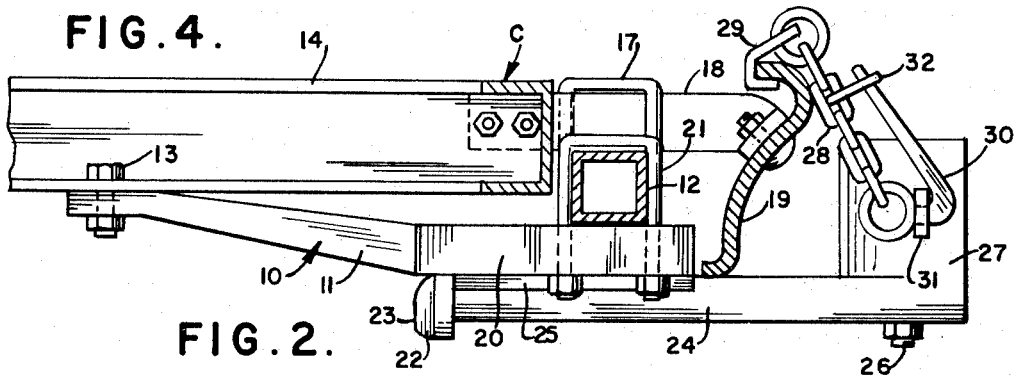
FIG. 2 is a fragmentary vertical sectional view, taken substantially in the plane of the line 2—2 in FIG. 1.
Figure 3:
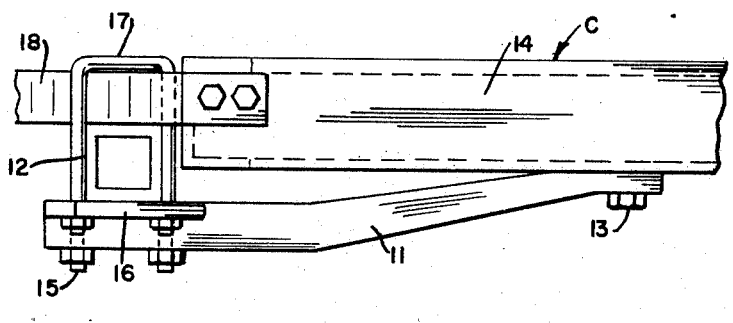
FIG. 3 is a fragmentary side elevational view, taken substantially from the line 3—3 in FIG. 1.

The hitch mounting comprises a supporting frame 10 which consists of a pair of transversely spaced side members 11 and a cross member 12, the side members 11 having front end portions secured, as by suitable bolts 13, to the underside of side members 14 of an automobile chassis indicated generally at C. It will be understood that FIG. 1 shows only one side portion of the chassis and that another chassis side member 14 and another frame side member 11 exist at the opposite side which is not illustrated.

The frame side members 11 project rearwardly beyond the chassis to carry the cross member 12 which is rigidly secured to the side members by U-clamps 15. Moreover, end portions of the cross member 12 are provided with clamping plates 16 and U-clamps 17 for rigidly securing the same to the usual, rearwardly projecting brackets 18 which extend from the chassis to carry the rear bumper bar 19.

A draw bar mounting plate 20, disposed on the longitudinal center of the chassis, is secured to the underside of the cross member 12 by a pair of U-clamps 21, and an eye 22 depends from the front end portion of the mounting plate. The eye 22 serves as a socket to removably receive a hooked front end 23 of a draw bar 24 which extends along the underside of the plate 20 and projects rearwardly beyond the rear bumper bar 19, as will be clearly apparent. A pair of guide rails 25 are provided at the underside of the plate 20 at the opposite sides of the draw bar 24 so as to restrain the latter from moving laterally, and these guide rails may be regarded as coacting with the eye 22 in providing the socket for the draw bar. Rearward movement of the draw bar in the socket is prevented by abutment of the draw bar end 23 with the eye 22, but it will be understood that by swinging the draw bar downwardly about the eye 22, the hooked end 23 of the draw bar may be withdrawn from the eye and the draw bar may thus be removed from the supporting frame 10 when use of the draw bar is not desired.

The rear end portion of the draw bar 24 carries a conventional coupling ball 26 for connection to a socket (not shown) on the draft tongue of a trailer (also not shown). In accordance with the disclosure in the aforesaid copending application, the ball 26 is contained in a rearwardly open housing 27 which is provided on the rear end portion of the draw bar so as to facilitate automatic coupling of the draw bar and draft tongue, which requires no further discussion in this application.

The draw bar 24 is firmly held in its operative position in the socket provided by the eye 22 and guide rails 25, this being attained by a pair of fastener chains 28, provided at one end with hooks 29 to engage the upper edge of the bumper bar 19, as shown. The other ends of the chains are equipped with keeper members 30 which pass through apertured lugs 31 provided on the opposite sides of the housing 27, the keeper members 30 being releasably locked in links 32 which project laterally from the chains 28, as will be clearly understood. Thus, with the chains 28 fastened, the draw bar 24 is securely held in its operative position against the underside of the mounting plate 20, but when the chains are removed, the draw bar may be readily separated from the mounting plate as already explained.

FIGS. 5-7 illustrate a modified embodiment of the trailer hitch mounting wherein the supporting frame 40 comprises a pair of side members 41 and a cross member 42, the side members being secured to the chassis side members 14 as at 43. The rear end portions of the side members 41 are suitably secured, as by bolts 44, to the cross member 42, the latter preferably consisting of an angle bar having a horizontal web 42h and a vertical web 42v at the rear edge of the horizontal web, as shown in FIG. 6. The end portions of the cross member 42 are equipped with bolts 45 having hooked upper ends to engage the bumper bar brackets 18, as will be clearly apparent from FIG. 7.

A depending flange 46 is provided at the front edge of the web 42h of the cross member 42, the flange being formed with a slot 47 which provides a socket for removable reception of the front end portion of a draw bar 48. The latter is disposed on the longitudinal center of the chassis and extends along the underside of the cross member web 42h, rearwardly beyond the bumper bar 19, the rear end portion of the draw bar carrying the coupling ball 26 and the ball housing 27, although the housing 27 need not be provided as far as this embodiment of the hitch mounting is concerned.

A U-bolt 49 is secured to and projects downwardly from the web 42h of the cross member 42, and projects through a slot 50 formed in the draw bar 48 so as to restrain the draw bar from movement, both laterally and longitudinally. The U-bolt 49 projects below the draw bar sufficiently to form what may be referred to as an eye in the bight portion of the U-bolt at the underside of the draw bar. A latch 51 has one end thereof pivoted to the underside of the draw bar 48 as at 52, the latch 51 having a lateral projection 52a which enters the eye of the U-bolt 49 so as to lock the draw bar 48 in its operative position against the underside of the cross member web 42h. The rear end of the latch 51 is provided with a finger-piece 53 whereby the latch may be pivotally moved in the direction of the arrow 54 in FIG. 5, so as to withdraw the latch projection 52a from the eye of the U-bolt 49. When this is accomplished, the draw bar 48 may be swung downwardly about the edge of the opening or slot 47 so as to withdraw the U-bolt 49 from the slot 50 in the draw bar, it being understood that the vertical dimension of the slot 47 in the flange 46 is somewhat greater than the thickness of the draw bar, so as to permit the downward swinging of the draw bar, as already mentioned. When the U-bolt 49 no longer engages the slot 50 in the draw bar, the latter may be withdrawn from the slot 47 in the flange 46, thus removing the draw bar from the supporting frame 40.

A suitable tension spring 54 extends from the finger-piece 53 to an anchoring post 55 at the underside of the draw bar 48, serving to bias the latch 51 to its locked position wherein the latch projection 51a is entered in the eye of the U-bolt 49.

It will be observed that in both embodiments of the invention, the draw bar may be quickly and easily removed from the supporting frame when use of the draw bar is not required and, with the draw bar removed, the supporting frame remains inconspicuously secured to the chassis without projecting beyond the rear bumper.

It will also be observed that in both embodiments of the invention the supporting frame for the hitch mounting, comprising transversely spaced side members and a cross member secured to the rear end portions of the side members, is substantially U-shaped and can be readily and removably secured to the chassis of a vehicle by means of bolts or other suitable fastening means and provides a quick and safe attachment. The side members 11 of the embodiment shown in FIGURE 1 are adjustably secured to the cross member 12 by means of U-bolts so as to permit adjustment of the transverse spacing between the side members 11 to adjust the supporting frame for chassis of different widths.

What is claimed as new is:

1. Trailer hitch mounting for an automobile which includes a chassis with rearwardly projecting brackets carrying a rear bumper bar, said hitch mounting comprising a support frame including a pair of transversely spaced side members adapted to be secured to said chassis so as to project rearwardly therefrom, a cross member secured to rear end portions of said side members, bumper bar bracket clamping means provided on end portions of said cross member, the mid-portion of said cross member being provided with a draw bar receiving socket, a draw bar having a front end portion removably received in said socket and also having a rear end portion projecting rearwardly beyond said cross member, a coupling ball carried by the rear end portion of said draw bar, and means for removably locking said draw bar in said socket, the cross member of said supporting frame including a depending flange portion provided with a draw bar receiving opening extending therethrough comprising said draw bar receiving socket.

2. Trailer hitch mounting for an automobile which includes a chassis with rearwardly projecting brackets carrying a rear bumper bar, said hitch mounting comprising a supporting frame adapted to be secured to said chassis, said frame including a cross member and a draw bar mounting plate intermediate the ends of said cross member, said plate being provided with a draw bar receiving socket, a draw bar having a front end portion removably received in said socket and also having a rear end portion projecting rearwardly beyond said cross member, a coupling ball carried by the rear end portion of said draw bar, and means provided on the rear end portion of the draw bar for engaging a bumper bar whereby to removably lock the draw bar in said socket, the cross member of said supporting frame including a depending flange portion provided with a draw bar receiving opening extending therethrough comprising said draw bar receiving socket.

3. The hitch mounting as defined in claim 2 wherein said socket and said draw bar include coacting abutment means to prevent movement of the draw bar at least in the rearward direction relative to the socket when the draw bar is in its locked position.

4. The hitch mounting as defined in claim 2 together with a rearwardly open housing enclosing said coupling ball and secured to said draw bar, said draw bar locking means comprising releasable bumper bar engaging means anchored to said housing.

5. The hitch mounting as defined in claim 4 wherein said bumper bar engaging means comprise a length of chain having a bumper bar engaging hook at one end thereof, and a keeper member provided at the other end of said chain, said housing being equipped with an apertured lug removably and lockingly receiving said keeper member therein.

6. The apparatus set forth in claim 4 wherein said bumper bar engaging means comprises a length of chain having a bumper bar engaging hook at one end thereof, a laterally projecting link secured to said chain adjacent said one end, and a keeper member provided at the other end of said chain, said housing being provided with an apertured lug removably receiving said keeper member, said keeper member having a narrow neck portion extending through the said aperture of said lug and an elongated return bend portion angled from said neck portion on the opposite side of aperture from said chain and extending back along said chain with the free end thereof releasably locked in said laterally projecting link.

7. The hitch mounting as defined in claim 2 together with bumper bar bracket clamping means provided on end portions of said frame cross member.

8. Trailer hitch mounting for an automobile which includes a chassis with rearwardly projecting brackets carrying a rear bumper bar, said hitch mounting comprising a supporting frame adapted to be secured to a chassis, said frame including a cross member provided intermediate the ends thereof with a draw bar receiving socket, a draw bar having a front end portion removably received in said socket and also having a rear end portion projecting rearwardly beyond said cross member, a coupling ball carried by the rear end portion of said draw bar, and coacting means provided on said draw bar and on said cross member for releasably locking the draw bar in said socket, the cross member of said supporting frame including a depending flange portion provided with a draw bar receiving opening extending therethrough comprising said draw bar receiving socket.

9. The hitch mounting as defined in claim 8 wherein said draw bar locking means include an eye attached to said cross member and projecting through a slot in the draw bar, and a latch carried by the draw bar, said latch being lockingly engageable with said eye.

10. The hitch mounting as defined in claim 9 together with resilient means biasing said latch to its locked position in said eye.

11. The hitch mounting as defined in claim 9 wherein said eye coacts with ends of the slot in said draw bar to prevent forward and rearward movement of the draw bar in said socket.

12. The apparatus defined in claim 9 wherein said eye comprises a U-bolt depending from said cross member with the bend portion thereof extending through the slot in the draw bar, and said latch comprises a latch bar pivotally secured beneath said draw bar, said latch bar having a laterally projecting finger for entering the bend of said U-bolt beneath the draw bar and holding the draw bar locked in said socket.

13. The apparatus set forth in claim 12 wherein said latch bar is pivoted at one end near the front end portion of said draw bar to swing in a plane substantially parallel with said draw bar, the other end of said latch bar extending rearwardly along said draw bar and having a finger piece secured thereto.

14. The hitch mounting as defined in claim 8 together with bumper bar bracket clamping means provided on end portions of said cross member.

15. The apparatus set forth in claim 1 wherein said cross member is adjustably secured to the rear end portions of said side members to permit variation in the transverse spacing of said side members to fit vehicle chassis of different widths.

16. The apparatus set forth in claim 1 wherein U-bolts are provided to adjustably secure the rear end portions of said side members to said cross member.

17. The apparatus set forth in claim 1 wherein separable fastening means are provided to detachably secure said side members to said vehicle chassis.

18. The apparatus set forth in claim 8 wherein said cross member is an angle bar having a horizontal web and a depending front flange along at least the central portion of the forward edge of said web, said socket comprising a slot provided in said depending flange for removably receiving the front end portion of said draw bar.

19. The apparatus set forth in claim 18 wherein said angle bar has a vertically upstanding rear flange along the rear edge of said web.

20. A trailer hitch mounting for an automobile which includes a chassis having a pair of transversely spaced longitudinal frame members and rearwardly projecting brackets carrying a bumper bar, said hitch mounting comprising a supporting frame including a pair of transversely spaced side members adapted to be secured to said chassis so as to project rearwardly therefrom, a cross member secured to the rear end portions of said side members, a draw bar, and means detachably securing said draw bar to the mid-portion of said cross member including a flange depending from the cross member and having a draw bar receiving opening extending therethrough, said side members being transversely spaced in accordance with the spacing of said longitudinal frame members, and means for detachably securing said side members beneath and in proximate parallel engagement with said pair of transversely spaced longitudinal frame members.

References Cited

UNITED STATES PATENTS

| | | | |
|---|---|---|---|
| 2,151,920 | 3/1939 | Jandus et al. | 280—501 |
| 2,549,941 | 4/1951 | Smith (I) | 280—501 |
| 2,622,892 | 12/1952 | Lowman | 280—495 |
| 2,576,461 | 11/1951 | Kammerer | 280—49 XR |
| 2,646,289 | 7/1953 | Smith (II) | 280—501 |
| 3,284,098 | 11/1966 | Worley | 280—406.1 |

LEO FRIAGLIA, Primary Examiner

U.S. Cl. X.R.

280—491, 495